United States Patent
Lee et al.

(10) Patent No.: US 6,706,171 B2
(45) Date of Patent: Mar. 16, 2004

(54) SYSTEMS FOR TREATING WASTEWATER IN A SERIES OF FILTER-CONTAINING TANKS

(75) Inventors: Jaw Fang Lee, Berwyn, PA (US); James J. Goodley, Mont Clare, PA (US); Mark J. Bubel, Sr., New London, PA (US); William D. McGurney, Limerick, PA (US); Wenjun Liu, King of Prussia, PA (US)

(73) Assignee: BioChem Technology, Inc., King of Prussia, PA (US)

( * ) Notice: Subject to any disclaimer, the term of this patent is extended or adjusted under 35 U.S.C. 154(b) by 0 days.

(21) Appl. No.: 09/973,661

(22) Filed: Oct. 9, 2001

(65) Prior Publication Data

US 2002/0043486 A1 Apr. 18, 2002

Related U.S. Application Data

(60) Provisional application No. 60/239,820, filed on Oct. 12, 2000.

(51) Int. Cl.[7] .............................. B01D 17/12; C02F 3/00
(52) U.S. Cl. ........................ 210/85; 210/96.1; 210/142; 210/143; 210/202; 210/257.2; 210/321.69; 210/500.23; 210/605; 210/614; 210/739
(58) Field of Search .......................... 210/85, 96.1, 141, 210/142, 143, 201, 202, 220, 257.2, 335, 500.23, 605, 614, 630, 639, 650, 739, 321.69, 636

(56) References Cited

U.S. PATENT DOCUMENTS

| 5,151,187 A | 9/1992 | Behmann |
| 5,174,900 A | 12/1992 | Nicholas et al. |
| 5,204,001 A | 4/1993 | Tonelli et al. |
| 5,209,852 A | 5/1993 | Sunaoka et al. |
| 5,254,253 A | 10/1993 | Behmann |
| 5,304,308 A | 4/1994 | Tsumura et al. |
| 5,401,400 A | 3/1995 | Tonelli et al. |
| 5,403,479 A | 4/1995 | Smith et al. |
| 5,639,373 A | 6/1997 | Mahendran et al. |
| 5,674,433 A | 10/1997 | Semmens et al. |
| 5,783,083 A | 7/1998 | Henshaw et al. |
| 5,868,934 A | * | 2/1999 | Yamasaki et al. ........... 210/202 |
| 5,868,937 A | 2/1999 | Back et al. |
| 5,910,250 A | 6/1999 | Mahendran et al. |

(List continued on next page.)

FOREIGN PATENT DOCUMENTS

| CA | 2137754 | 6/1995 |
| JP | 57 180487 A | 11/1982 |
| JP | 07 075782 A | 3/1995 |
| WO | WO 98/01397 | 1/1998 |

OTHER PUBLICATIONS

Zenon Environmental Inc. Web Page *ZeeWeed® Immersed Membranes For Wastewater Treatment*, pp. 1–2, undated.
Zenon Environmental Inc. Web Page *Zenon's ZeeWeed® Immersed Membrane*, pp. 1–2, undated.
Zenon Environmental Inc. Web Page *Municipal Wastewater Treatment*, p. 1, undated.

*Primary Examiner*—Joseph W. Drodge
(74) *Attorney, Agent, or Firm*—Piper Rudnick LLP (57) ABSTRACT

This invention relates to systems for treating wastewater and more particularly to removing nutrients from wastewater in a wastewater treatment system. Wastewater tanks, each having membrane filters, are arranged in series. Each tank is equipped with respective inlets and outlets and an air supply as well as detectors for monitoring various wastewater parameters. A controller is coupled to the detectors, inlets and outlets for effecting sequences of opening and closing the inlets and outlets and turning the air supplies on and off in response to various detecting conditions and effects different operations, including a cleaning mode, in different cycles.

29 Claims, 3 Drawing Sheets

U.S. PATENT DOCUMENTS

| | | | |
|---|---|---|---|
| 5,942,108 A | * 8/1999 | Yang | 210/202 |
| 5,944,997 A | 8/1999 | Pedersen et al. | |
| 5,947,689 A | 9/1999 | Schick | |
| 5,976,888 A | 11/1999 | Lee et al. | |
| 5,997,743 A | 12/1999 | Ahn et al. | |
| 6,042,677 A | 3/2000 | Mahendran et al. | |
| 6,099,731 A | 8/2000 | Uchiyama et al. | |
| 6,312,600 B1 | * 11/2001 | Audic et al. | 210/614 |

* cited by examiner

SYSTEMS FOR TREATING WASTEWATER IN A SERIES OF FILTER-CONTAINING TANKS

This application claims benefit of U.S. Ser. No. 60/239,820, filed on Oct. 12, 2000.

FIELD OF THE INVENTION

This invention relates to processes and systems for treating wastewater and more particularly to removing nutrients from wastewater in a wastewater treatment process.

BACKGROUND OF THE INVENTION

The prior art has employed many devices and systems to process and purify water from industrial operations and municipal sources prior to discharging the water. Activated-sludge wastewater treatment plants (WWTP's), which are well known in the art, have been most often utilized to address this problem. Additionally, many industrial and municipal water treatment plants utilize biological systems to pre-treat their wastes prior to discharging into the usual municipal treatment plant. In these processes, the microorganisms used in the activated sludge break down or degrade contaminants for the desired water treatment. Efficient process performance and control requires quick and accurate assessment of information on the activity of microorganisms. This has proven to be a difficult task in view of the wide variety of materials and contaminants that typically enter into treatment systems. Also, variations in the quantity of wastewater being treated, such as daily, weekly or seasonal changes, can dramatically change numerous important factors in the treatment process, such as pH, temperature, dissolved oxygen, nutrients and the like, alteration of which can be highly detrimental to proper wastewater treatment. Improperly treated wastewater poses serious human health dangers.

Various biological nutrient removal (BNR) processes are currently used in wastewater treatment plants to assist in contamination degradation. In a typical BNR process, contaminants in the wastewater, such as carbon sources (measured as biochemical oxygen demand or BOD), ammonia, nitrates, phosphates and the like are digested by the activated sludge in anaerobic, anoxic and aerobic stages, also known in the art. In the anaerobic stage, the wastewater, with or without passing through a preliminary settlement process, is mixed with return activated sludge (RAS).

In many wastewater treatment plants one anaerobic stage is arranged in the BNR process. In the anaerobic stage poly-P microbial species take up short chain carbonaceous nutrient and store this nutrient intracellularly most commonly as polyhydroxybutyrate (PHB). Microorganisms must expend energy to accomplish this uptake of soluble organics and formation of intracellular storage products. The energy is obtained anaerobically through the cleavage of high energy phosphate bonds in stored long-chain inorganic polyphosphates. This process produces orthophosphate that is released from the cell into solution in the anaerobic zone. In a subsequent oxic stage, a rapid uptake of soluble orthophosphate provides for the resynthesis of the intracellular polyphosphates. Previously stored PHB is also aerobically metabolized to carbon dioxide, water, and new cells. When solids are wasted from the treatment process, the orthophosphate taken up by the poly-P microbes results in up to four times the phosphorus removal in comparison to a conventional treatment process without an anaerobic zone.

In most wastewater treatment plants, one or several anoxic stages are arranged in the BNR process. In the anoxic stages, denitrifiers, i.e., microbial species capable of denitrification, utilize nitrate and/or nitrite as electron acceptors and consume some of the available carbon sources during the denitrification process. $NO_x$ is reduced stepwise to nitrogen gas and released to the atmosphere in the following manner:

The nitrate is usually supplied by recycling a certain volume of wastewater from the end of the oxic stage back to the beginning of the anoxic stage.

One or several oxic stages are typically employed in BNR processes. In the oxic stage, air which contains about 20% oxygen or pure oxygen, is supplied so that a desired dissolved oxygen level is maintained. Autotrophic organisms, i.e., microbial species capable of using ammonia as their energy source, convert ammonia to nitrite and nitrate under aerobic conditions. The poly-P microbial species in the wastewater uptake phosphate from the water phase and digest their intracellular PHB and PHV storage products converting it into polyphosphate, a compound for energy storage. The polyphosphate pool of the poly-P microbial species is thus replenished and phosphorous is removed from the water phase. The phosphorous is then removed from the system by sludge wasting, which is well known in the art. Under aerobic conditions, the remaining carbon sources in the water phase are further digested by aerobic organisms.

As the degradation of the contaminants nears completion, the microorganisms and the treated water are led through a solid/liquid separation process where the biosolids are separated from the liquid. The biosolids are then either recycled back to the anaerobic/anoxic/oxic treatment processes, or removed from the treatment process as waste biosolids. Common devices used in the solid/liquid separation are clarifiers where biosolids are settled to the bottom and withdrawn by recycling pumps while clear liquid flows over discharge weirs at the clarifier surface. Air flotation devices are also frequently used in the solid/liquid separation process. These are commonly known in the art.

However, many of the current wastewater treatment plants require clarifiers which increase the amount of space utilized by the wastewater treatment plant, add to the initial capital costs and increase operating and maintenance costs. Also, such systems oftentimes utilize significant operator input, which adds additional costs and, as mentioned above, utilize recycling/return systems which increase the capital costs, as well as the operating and maintenance costs. Finally, there is a significantly increased hydraulic retention time (HRT) in the overall treatment process.

SUMMARY OF THE INVENTION

In one aspect the invention relates to a system for removing BOD and $NH_3$ from wastewater including a first wastewater treatment tank $T_1$ having a first tank inlet $I_1$ and a first tank outlet $O_1$ with a first tank membranous filter $F_1$, a second wastewater treatment tank $T_{n-1}$ operatively connected to tank $T_1$ to permit wastewater to flow between tanks $T_1$ and $T_{n-1}$, and an Nth wastewater treatment tank $T_n$ having an Nth tank inlet $I_n$ and an Nth tank outlet $O_n$ with an Nth tank membranous filter $F_n$ operatively connected to tank $T_{n-1}$ to permit wastewater to flow between tanks $T_{n-1}$ and $T_n$.

There is also a $NH_4$ detector $AD_1$ connected to tank $T_1$, a $NH_4$ detector $AD_n$ connected to tank $T_n$, a TSS detector $TD_1$ connected to tank $T_1$, and a TSS detector $TD_n$ connected to tank $T_n$ and an air supply connected to at least one of said tanks.

A controller connects to an air supply, inlets $I_1$ and $I_n$, outlets $O_1$ and $O_n$, $NH_3$ detectors $AD_1$ and $AD_n$, and TSS detectors $TD_1$ and $TD_n$. The controller shifts between operational cycles $C_1$ and $C_2$, wherein in cycle $C_1$, $I_1$ and $O_n$ are on, $I_n$ is off and $F_1$ is in a cleaning mode until $AD_1 \geq X$ or $TD_1 \leq Y$, wherein X and Y are selected concentrations of $NH_3$ and TSS, respectively, and wherein in cycle $C_2$, $I_n$ and $O_1$ are on, $I_1$ is off and $F_n$ is in a cleaning mode until $AD_n \geq X$ or $TD_n \leq Y$.

In another aspect, the invention relates to a system for removing nutrients from wastewater including a first wastewater treatment tank $T_1$ having a first tank inlet $I_1$ and a first tank $O_1$ with a first tank membranous filter $F_1$, an Nth wastewater treatment tank $T_n$ having an Nth tank inlet $I_n$ and an Nth tank $O_n$ with an Nth tank membranous filter $F_n$, a second wastewater treatment tank $T_2$ operatively connected to tank $T_1$ to permit wastewater to flow between tanks $T_1$ and $T_2$ and having a second tank inlet $I_2$ connected to inlets $I_1$ and $I_n$, a third wastewater treatment tank $T_3$ operatively connected to tank $T_2$ to permit wastewater to flow between tanks $T_2$ and $T_3$, and an N–1 wastewater treatment tank $T_{n-1}$ operatively connected to tanks $T_3$ and $T_n$ to permit wastewater to flow between tanks $T_3$ and $T_{n-1}$ and between tanks $T_{n-1}$ and $T_n$, and having an N–1 tank inlet $I_{n-1}$ connected to inlets $I_1$ and $I_n$.

The system also includes an $NH_3$ detector $AD_1$ connected to tank $T_1$, an $NH_3$ detector $AD_n$ connected to tank $T_n$, a TSS detector $TD_1$ connected to tank $T_1$, a TSS detector $TD_n$ connected to tank $T_n$, an $NO_3$ detector $ND_2$ connected to tank $T_2$, an $NO_3$ detector $ND_{n-1}$ connected to tank $T_{n-1}$, and an air supply and/or mixing device connected to at least one of said tanks.

A controller connects to the air supply mixing device, inlets $I_1$, $I_2$, $I_{n-1}$ and $I_n$, outlets $O_1$ and $O_n$, $NH_3$ detectors $AD_1$ and $AD_n$, TSS detectors $TD_1$ and $TD_n$, and $NO_3$ detectors $ND_2$ and $ND_{n-1}$. The controller shifts between operational cycles $C_1$ and $C_2$, wherein, in cycle $C_1$, $I_1$ and $O_n$ are on, $I_n$ is off, $F_1$ is in a cleaning mode, and $I_2$ and $I_{n-1}$ are on at j and k, wherein j and k are selected percentages of $I_1$, until 1) $AD_1 \geq X$ or $TD_1 \leq Y$ or 2) $ND_{n-1} + AD_n \geq Z$, wherein X, Y and Z are selected concentrations of $NH_3$, TSS and $NO_3 + NH_3$, respectively, and wherein in cycle $C_2$, $I_n$ and $O_1$ are on, $I_1$ is off, $F_n$ is in a cleaning mode, and $I_{n-1}$ and $I_2$ are on at l and m, wherein l and m are selected percentages of $I_n$, and wherein the air supply is shut off in $T_{2+1}$, when $ND_2 \geq A$ is in cycle $C_1$ and in $T_{n-2}$ when $ND_{n-1} \geq A$ is in cycle $C_2$, wherein A is a selected concentration of $NO_3$.

In yet another aspect, the invention relates to a system for removing phosphorus from wastewater including a first wastewater treatment tank $T_1$ having a first tank inlet $I_1$ and a first tank outlet $O_1$ with a first tank filter $F_1$, an Nth wastewater treatment tank $T_n$ having an Nth tank inlet $I_n$ and an Nth tank outlet $O_n$ with an Nth tank filter $F_n$, a second wastewater treatment tank $T_2$ operatively connect to tank $T_1$ to permit wastewater to flow between tanks $T_1$ and $T_2$, a third wastewater treatment tank $T_3$ operatively connected to tank $T_2$ to permit wastewater to flow between tanks $T_2$ and $T_3$, an N–1 wastewater treatment tank $T_{n-1}$ operatively connected to tanks $T_3$ and $T_n$ to permit wastewater to flow between tanks $T_3$ and $T_{n-1}$ and between tanks $T_{n-1}$ and $T_n$, a $PO_4$ detector $PD_1$ connected to tank $T_1$, a $PO_4$ detector $PD_n$ connected to tank $T_n$, a TSS detector $TD_1$ connected to tank $T_1$, a TSS detector $TD_n$ connected to tank $T_n$, an air supply and/or a mixing device connected to at least one of the tanks, and a controller connected to the air supply mixing device, inlets $I_1$ and $I_n$, outlets $O_1$ and $O_n$, $PO_4$ detectors $PD_1$ and $PD_n$, TSS detectors $TD_1$ and $TD_n$, and Filters $F_1$ and $F_n$, the controller shifting between operational cycles $C_1$ and $C_2$, wherein, in cycle $C_1$, the air is off in $T_1$ and on in $T_n$, $I_1$ and $O_n$ are on and $I_n$ and $O_1$ are off until 1) $PD_1 \leq X$ or $TD_1 \leq Y$ or 2) $PD_n \geq Z$ wherein X, Y, and Z are selected concentrations of $PO_4$, TSS, and $PO_4$, respectively, and wherein cycle $C_2$, the air is off in $T_n$ and on in $T_1$, $I_n$ and $O_1$ are on and $I_1$ and $O_n$ are off until 1) $PD_n \leq X$ or $TD_n \leq Y$ or 2) $PD_1 \geq Z$, wherein X, Y, and Z are selected concentrations of $PO_4$, TSS, and $PO_4$, respectively.

DETAILED DESCRIPTION OF THE INVENTION

The following description is intended to refer to specific embodiments of the invention illustrated in the drawings and is not intended to define or limit the invention, other than in the appended claims. Also, the drawing is not to scale and various dimensions and proportions are contemplated.

Figure 1:
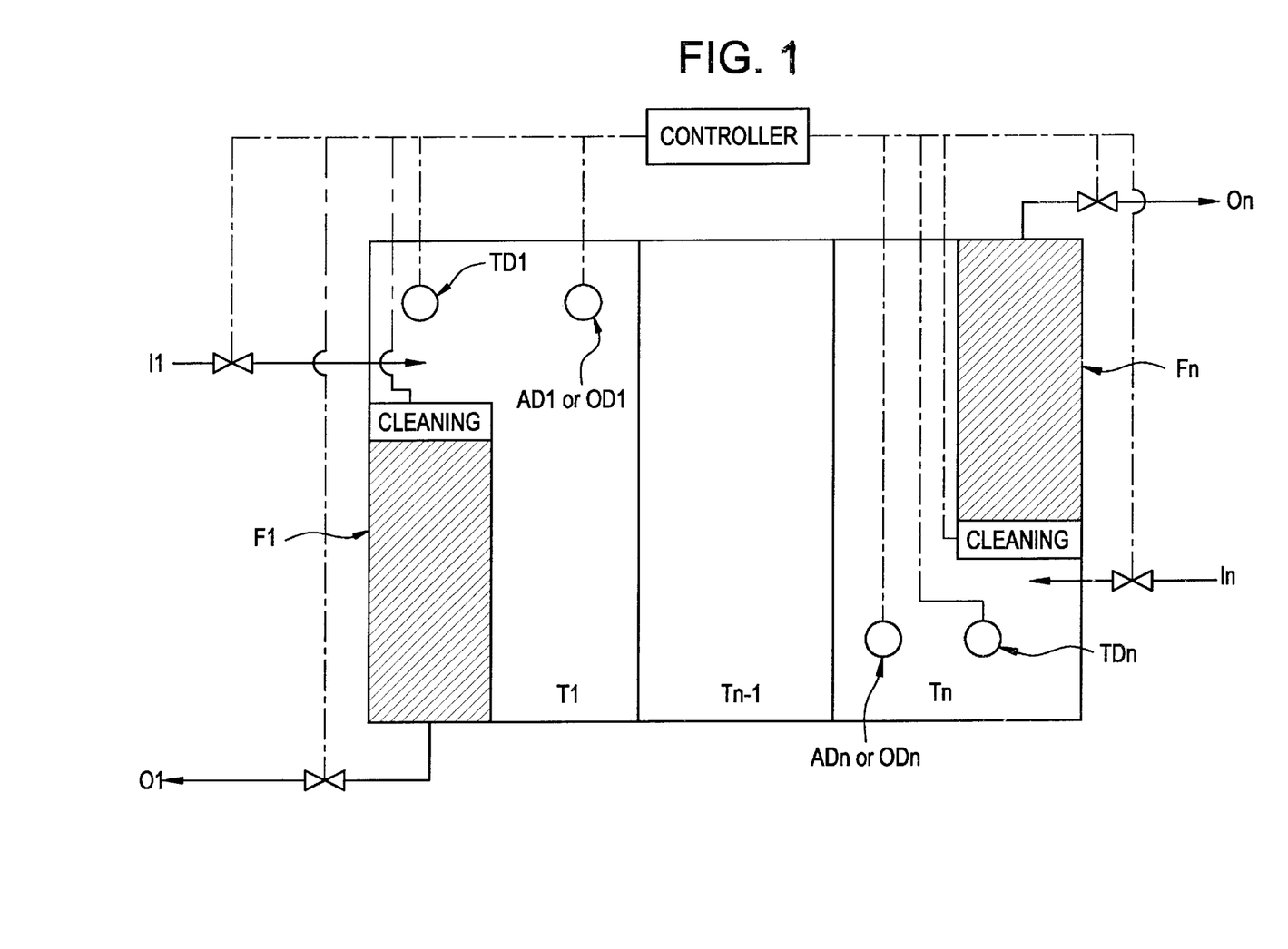
FIG. 1 is a schematic of a wastewater treatment system capable of removing organic material and ammonia.

Referring to FIG. 1, a system for removing biochemical oxygen demand (BOD) and/or $NH_3/NH_4^+$ is shown. The system includes a tank $T_1$ located adjacent tank $T_{n-1}$, which is located adjacent to tank $T_n$. Although the tanks are shown directly adjacent to one another, it is not necessary that they be in contact, so long as they are operatively connected and that wastewater may flow between tanks $T_1$ and $T_{n-1}$ on the one hand, and tanks $T_{n-1}$ and $T_n$ on the other hand. Also, all tanks should preferably include means to introduce air into the wastewater, such as with an air diffuser or the like.

Tank $T_1$ is connected to an influent line $I_1$ and tank $T_n$ is connected to an influent line $I_n$. Tank $T_1$ is connected to an outlet line $O_1$ and tank $T_n$ is also connected to an outlet line $O_n$. Each of the outlet lines $O_1$ and $O_n$ connect to a filter unit which are preferably membranous-type filters, $F_1$ and $F_n$, respectively. Also, each filter $F_1$ and $F_n$ has a means for cleaning the filter, which (over time) can and/or does become laden with particulate matter. The particular details, structure and operation of the cleaning aspect of the filter is not important, so long as the cleaning capability is present.

Filters $F_1$ and $F_n$ are membrane type filters which are depicted within Tanks $T_1$ and $T_n$ but which do not necessarily have to be located within Tanks $T_1$ and $T_n$ but which could be located outside of the tanks but operatively connected to tanks $T_1$ and $T_n$ respectively.

Tank $T_1$ is provided with an $NH_3/NH_4^+$ detector $AD_1$ as well as a TSS detector $TD_1$. Similarly, tank $T_n$ is provided with an $NH_3/NH_4^+$ detector $AD_n$ and a TSS detector $TD_n$. Preferred detectors AD are made by Myratek, Inc. and preferred detectors TD are made by Royce Instrumentation Corp., for example. It is also possible to supplement or substitute for detectors $AD_1$ and $AD_n$ with OUR (oxygen uptake rate) detectors $OD_1$ and $OD_n$ as shown in FIG. 1.

The system is also provided with a controller, which typically comprises an on-line computer system with appropriately programmed software, that connects to the various components $I_1$, $I_n$, $O_1$, $O_n$, $AD_1$, $AD_n$, $TD_1$ and $TD_n$ to monitor and control operation of the system. The controller operates in alternating cycles $C_1$ and $C_2$ depending on the detected conditions within the system. For example, in cycle $C_1$, inlet $I_1$ and outlet $O_n$ are opened so that wastewater can flow into the system at tank $T_1$ and out of the system at tank $T_n$. Inlet $I_n$ is closed as is outlet $O_1$. Filter $F_1$ is most preferably caused to enter into a cleaning mode during each cycle, although it may not enter the cleaning mode on any given cycle depending on need or system set up.

The system operates in cycle $C_1$ until detector $AD_1$ or $TD_1$ detects a concentration of $NH_3/NH_4^+$ or TSS, respectively, that is greater than or equal to selected concentrations X and Y, respectively. Representative values for concentration X include about 1 ppm to about 10 ppm, for example, and for concentration Y about 3000 ppm to about 20,000 ppm, although concentrations outside these ranges may be possible depending on the conditions. When those concentrations are exceeded, the controller switches from cycle $C_1$ to cycle $C_2$. Cycle $C_2$ changes a number of operational parameters wherein inlet $I_n$ and outlet $O_1$ are opened to cause wastewater to flow into tank $T_n$, through tank $T_{n-1}$ and into tank $T_1$ and, finally, outwardly through outlet $O_1$. Inlet $I_1$ is closed as is outlet $O_n$. Filter $F_n$ is most preferably placed into a cleaning mode, although it may not enter the cleaning mode on any given cycle depending on need or system set up.

The system operates in cycle $C_2$ until detector $AD_n$ or $TD_n$ detects a concentration of $NH_3/NH_4^+$ or TSS, respectively, greater than or equal to the selected concentrations X and Y, at which point the system switches back from cycle $C_2$ to cycle $C_1$. Typically, the concentrations X and Y vary from the ranges mentioned above, but can be outside of those ranges, depending on a wide variety of circumstances. Although the previous description contemplates the use of detectors and a controller to alternate between cycles $C_1$ and $C_2$, it is entirely possible that the alternating between cycles $C_1$ and $C_2$ could be initiated by timer control.

Figure 2:
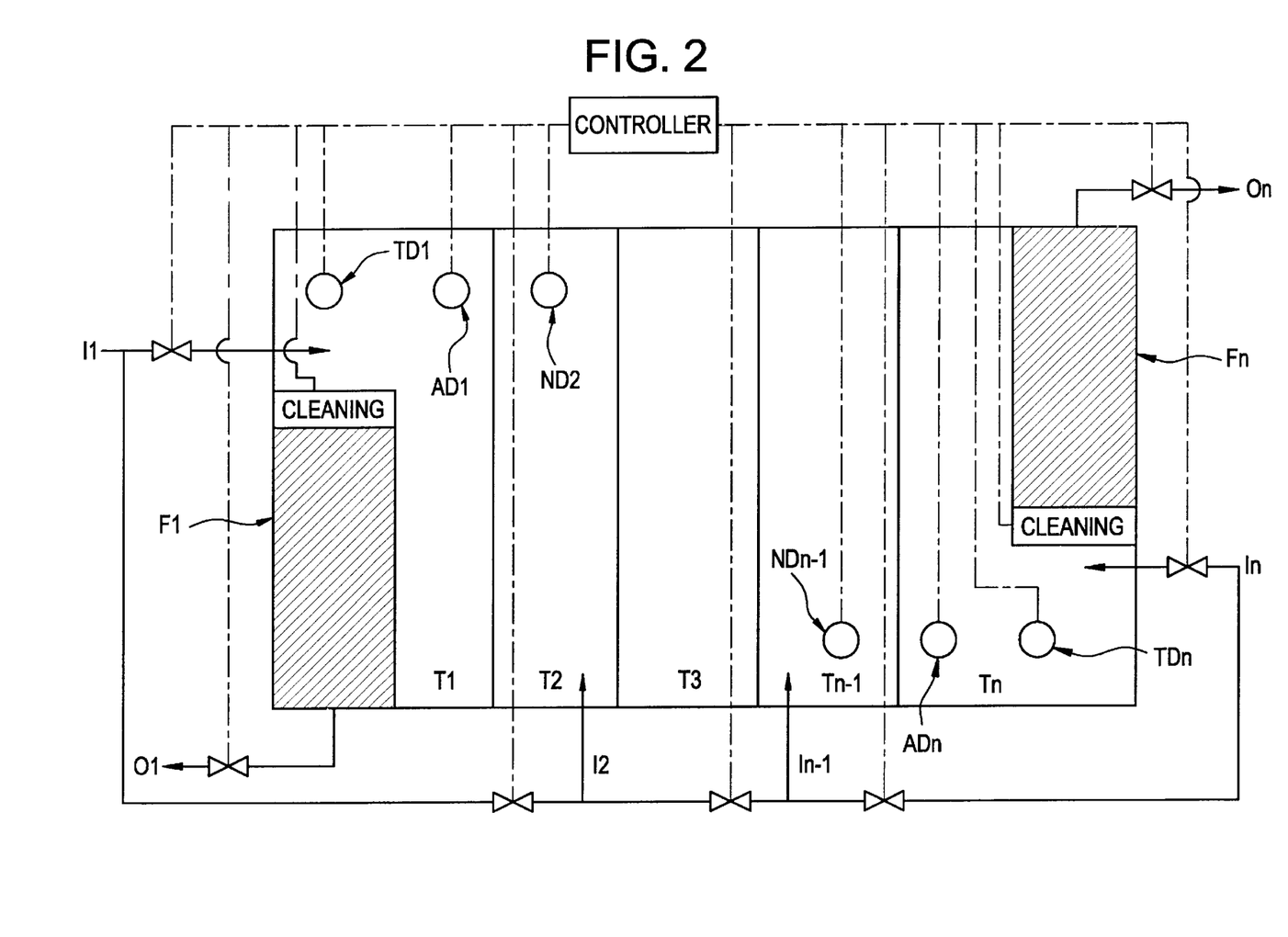
FIG. 2 is a schematic of a preferred nutrient-removal system in accordance with additional aspects of the invention.

Referring to FIG. 2, another preferred nutrient-removal system is shown. FIG. 2 depicts a system having five separate tanks $T_1$, $T_2$, $T_3$, $T_{n-1}$ and $T_n$. While that particular system has five tanks, additional tanks are contemplated depending on the circumstances. In principal, the system of FIG. 2 operates similarly to the system of FIG. 1 except that it has a greater number of tanks and also has additional capabilities with respect to tanks $T_2$ and $T_{n-1}$. Again, all tanks most preferably include means to introduce air into the wastewater as well as means to mix the tank contents without aeration.

In the same manner, as noted above, there are a series of adjacent tanks $T_1$ . . . $T_n$ that are operatively connected to one another. As before, they need not literally be adjacent to one another, but are shown as such for matters of convenience and as a preferred form that minimizes the footprint of the system and construction materials. Wastewater is accordingly free to flow between the individual adjacent tanks, but ultimately is capable of flowing from tank $T_1$ to tank $T_n$ and vice versa. Tanks $T_1$ and $T_n$ have inlets $I_1$ and $I_n$, as well as outlets $O_1$ and $O_n$ as the previous system. The outlets are connected to the filter units in a manner similar to that shown in FIG. 1.

Tank $T_2$ is additionally provided with an $NO_3$ detector $ND_2$, as is tank $T_{n-1}$ ($ND_{n-1}$). A preferred $NO_3$ detector may be obtained from Myratek, Inc., for example. Further, tanks $T_2$ and $T_{n-1}$ are provided with a connection to inlets $I_1$ and $I_n$ so that they are capable of receiving wastewater from either of those sources. The $NO_3$ detectors $ND_2$ and $ND_{n-1}$, as well as the inlets $I_2$ and $I_{n-1}$ are connected to the controller in addition to the inlets $I_1$ and $I_n$, the outlets $O_1$ and $O_n$, $NH_3/NH_4^+$ detectors $AD_1$ and $AD_n$ and TSS detectors $TD_1$ and $TD_n$.

The system shown in FIG. 2 also operates in a two-cycle mode wherein in cycle $C_1$, inlet $I_1$ and outlet $O_n$ are placed in the on position to receive wastewater into tank $T_1$ and discharge treated effluent from outlet $O_n$. Inlet $I_n$ is closed, as is outlet $O_1$. Preferably, filter $F_1$ is placed into the clean mode. However, additionally, j and k percent of the amount of wastewater flowing into tank $T_1$ through inlet $I_1$ is introduced into tanks $T_2$ and $T_{n-1}$, respectively.

Cycle $C_1$ continues in operation until detector $AD_1$ detects concentrations of $NH_3/NH_4^+$ greater than or equal to X, or detector $TD_1$ detects concentrations of TSS less than or equal to Y, at which point cycle $C_1$ switches to cycle $C_2$. As before, X and Y represent concentrations of $NH_3/NH_4^+$ and TSS, respectively. Also, cycle $C_1$ switches to cycle $C_2$ when the additive concentration detected by detectors $ND_{n-1}$+ $AD_n$ exceeds or is equal to Z, which is the concentration of $NO_3+NH_3$ detected in tank $T_{n-1}$.

Further, the controller is connected to the air supply system and, when the concentration A of $NO_3$ in tank $T_2$ exceeds a selected level, then the air supply is turned off in tank $T_{2+1}$. Air is off in tanks $T_2$ and $T_{n-1}$ in cycle $C_1$.

Cycle $C_2$ includes opening inlet $I_n$ and outlet $O_1$ such that wastewater enters into tank $T_n$ and flows through the system towards tank $T_1$ and outwardly thereof. Inlet $I_1$ is off as is outlet $O_n$. Preferably, the filter $F_n$ is placed into the cleaning mode. Also, 1 and m percent of the quantity of wastewater flowing into tank $T_n$ through inlet $I_n$ is introduced into tanks $T_2$ and $T_{n-1}$, respectively, through inlets $I_2$ and $I_{n-1}$, wherein 1 and m are selected percentages of the total quantity of wastewater flowing through inlet $I_n$. Air is off in tanks $T_2$ and $T_{n-1}$ in cycle $C_2$.

The system continues to operate in cycle $C_2$ until detector $AD_n$ or $TD_n$ detect concentrations of $NH_3/NH_4^+$ or TSS greater than or equal to X or less than or equal to Y, respectively, at which point cycle $C_2$ switches to cycle $C_1$. Similarly, the system switches from cycle $C_2$ to cycle $C_1$ when the concentration of $NO_3$ in tank $T_2$ plus the concentration of $NH_3/NH_4^+$ in tank $T_1$ as detected by detectors $ND_2$ and $AD_1$ exceeds or is equal to Z, which is a selected concentration.

Finally, air is supplied to tank $T_{n-2}$ until the concentration of $NO_3$ detected by detector $ND_{n-1}$ is greater than or equal to concentration A, at which point air is then turned off.

Figure 3:
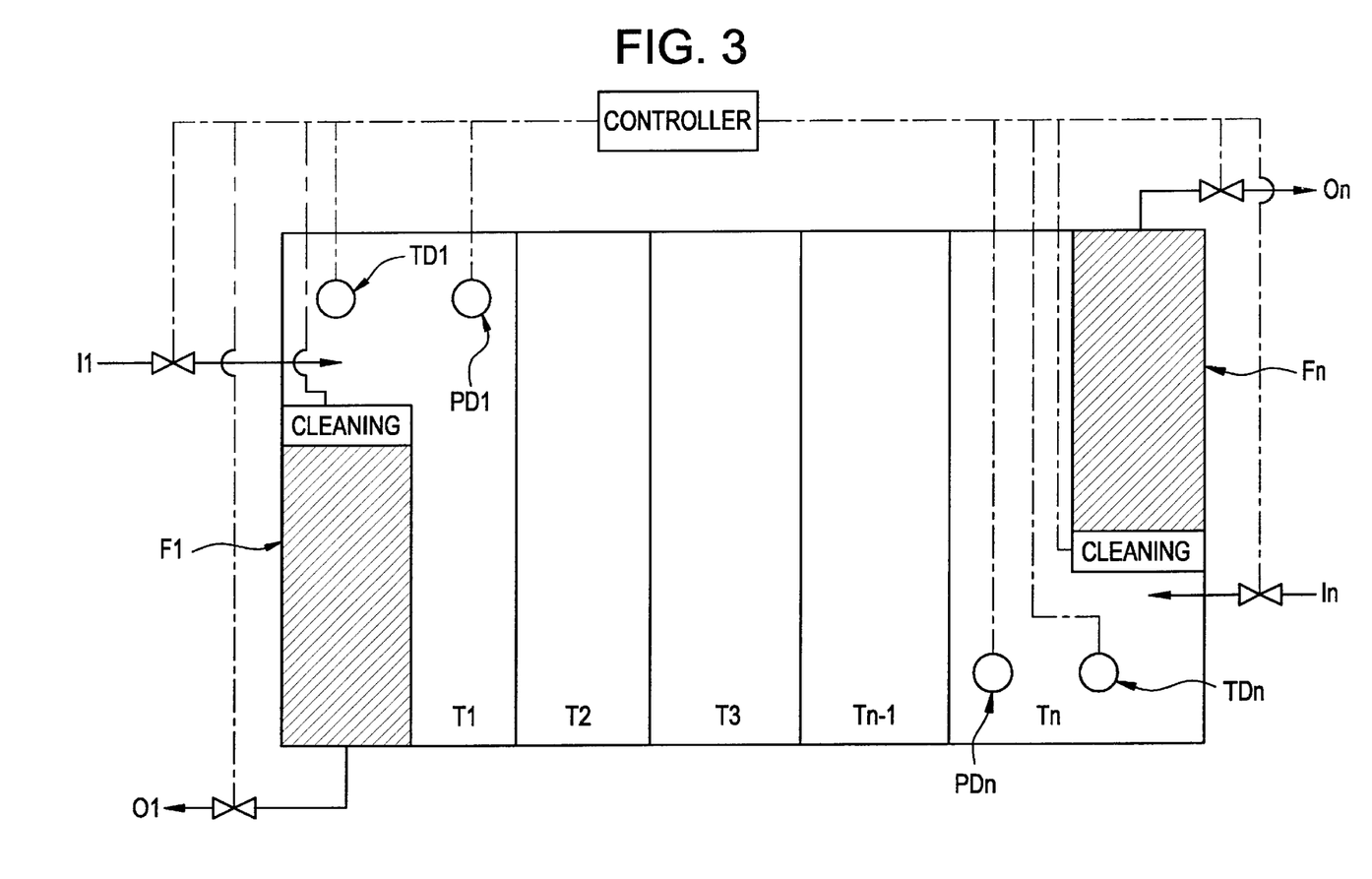
FIG. 3 is a schematic of a preferred phosphorus removal system.

Referring to FIG. 3, another preferred nutrient removal system is arranged to remove phosphorus. FIG. 3 depicts a system having 5 separate tanks, $T_1$, $T_2$, $T_3$, $T_{n-1}$ and $T_n$. While the depicted system has five tanks, any number of additional tanks are contemplated depending on the circumstances. In principal, the system of FIG. 3 operates similarly to the system of FIG. 1 except that it has a greater number of tanks and also has additional capabilities with respect to tanks $T_1$ and $T_n$. Again, all tanks most preferably include means to introduce air into the wastewater as well as means to mix the tanks without aeration.

In the same manner, as noted above, there are a series of adjacent tanks $T_1$ . . . $T_n$ that are operatively connected to each other. As before, they do not need to be literally adjacent to one another, but are shown as such for matters of convenience and as a preferred form that minimizes the footprint of the system. Wastewater is accordingly free to flow between the individual tanks but ultimately is capable of flowing from tank $T_1$ to tank $T_n$ and vice versa. Tanks $T_1$ and $T_n$ have inlets $I_1$ and $I_n$ as well as outlets $O_1$ and $O_n$ as the previous system. The outlets are connected to the filter units in a manner similar to that shown in FIG. 1.

Tank $T_1$ is additionally provided with $PO_4$ detector, $PD_1$, as is tank $T_n$ ($PD_n$). A preferred $PO_4$ detector is Chemscan, Inc. for example. Tanks $T_1$ and $T_n$ are also equipped with TSS detectors. The $PO_4$ detectors, $PD_1$ and $PD_n$ as well as the inlets, $I_1$ and $I_n$, the outlets $O_1$ and $O_n$, and TSS detectors $TD_1$ and $TD_n$ are connected to the system controller.

The system shown in FIG. 3 also operates in a two-cycle mode wherein in cycle $C_1$, inlet $I_1$ and outlet $O_n$ are placed in the "on" position to receive wastewater into tank $T_1$ and discharge effluent from outlet $O_n$. Inlet $I_n$ is closed as is outlet $O_1$. Preferably, filter $F_1$ is placed into the clean mode.

Cycle $C_1$ continues in operation until detector $PD_1$ detects a concentration of phosphate less than or equal to X, or detector $TD_1$ detects a concentration of Tss less than or equal to Y or detector $PD_n$ detects a concentration of phosphate greater than or equal to Z, at which cycle $C_1$ switches to cycle $C_2$. X and Z both represent certain concentrations of phosphate and Y represents a concentration of TSS.

Further, the controller is connected to the air supply and influent flow control system such that in cycle $C_1$, the air is off and anaerobic conditions are present in $T_1$ and $I_1$ and $O_n$ are on. Also, the air is on in subsequent tanks $T_2$ through $T_n$. In the same fashion, in cycle $C_2$, the air is off and anaerobic conditions are present in $T_n$ and $I_n$ and $O_1$ are on. Also, the air is on in subsequent tanks $T_{n-1}$ through $T_1$.

Cycle $C_2$ includes opening inlet $I_n$ and outlet $O_1$ such that wastewater enters into tank $T_n$ and flows through the system towards tank $T_1$ and outwardly thereof. Inlet $I_1$ is off as is outlet $O_n$. Preferably, the filter $F_n$ is placed into the cleaning mode. Air is off in tank $T_n$ and on in subsequent tanks in cycle $C_2$.

The system continues to operate in cycle $C_2$ until detector $PD_n$ detects a concentration less than or equal to X or detector $TD_n$ detects a concentration less than or equal to Y or detector $PD_1$ detects a concentration greater than or equal to Z, at which point cycle $C_2$ switches to cycle $C_1$.

The above two-cycle operation for the systems shown in FIGS. 1, 2 and 3, as well as other systems contemplated herein, although not shown in the drawings, provides significant advantages over prior systems. The above-described systems provide wastewater that is treated to the degree that it is "nearly" potable and could be rendered potable simply by passage of the water through a reverse osmosis membrane, for example. Additionally, the above systems do not require the utilization of clarifiers which are commonly used in prior art wastewater treatment systems. This provides the advantage of having an overall system with a smaller footprint, greater reliability, reduced capital expenditures as well as operational and maintenance costs.

Also, the above-described systems can be highly automated, which reduces the amount of human operator attention required, thereby further reducing operational costs and further reducing operational uncertainties.

A still further advantage in the reduction of initial capital investment as well as operational costs is the elimination of the traditional recycle/return systems utilized in conventional systems. Also, elimination of such recycle/return systems results in an increase in HRT relative to conventional systems.

Also, by preselecting or setting the various detector levels, the treated water can virtually be assured of compliance with permits for the particular facility at issue. Finally, the system provides for the capability of nutrient removal, which is lacking in many of the prior art systems and provides for the ability to achieve and maintain higher MLSS concentration, i.e. 2–3 times that of conventional systems, thereby resulting in an increase in treatment capacity per unit volume.

Although this invention has been described with reference to specific forms of apparatus and method steps, it will be apparent to one of ordinary skill in the art that various equivalents may be substituted, the sequence of steps may be varied, and certain steps may be used independently of others, all without departing from the spirit and scope of the invention defined in the appended claims.

What is claimed is:

1. A system for removing BOD and $NH_3$ from wastewater comprising:
   a) a first wastewater treatment tank $T_1$ having a first tank inlet $I_1$ and a first tank outlet $O_1$ with a first tank filter $F_1$;
   b) another wastewater treatment tank $T_{n-1}$ operatively connected to tank $T_1$ to permit wastewater to flow between tanks $T_1$ and $T_{n-1}$;
   c) an Nth wastewater treatment tank $T_n$ having an Nth tank inlet $I_n$ and an Nth tank outlet $O_n$ with an Nth tank filter $F_n$ operatively connected to tank $T_{n-1}$ to permit wastewater to flow between tanks $T_{n-1}$ and $T_n$;
   d) a $NH_3$ detector $AD_1$ connected to tank $T_1$;
   e) a $NH_3$ detector $AD_n$ connected to tank $T_n$;
   f) a TSS detector $TD_1$ connected to tank $T_1$;
   g) a TSS detector $TD_n$ connected to tank $T_n$;
   h) an air supply connected to at least one of said tanks; and
   i) a controller connected to an air supply inlets $I_1$ and $I_n$, outlets $O_1$ and $O_n$, filters $F_1$ and $F_n$, $NH_3$ detectors $AD_1$ and $AD_n$, and TSS detectors $TD_1$ and $TD_n$, the controller shifting between operational cycles $C_1$ and $C_2$, wherein in cycle $C_1$, $I_1$ and $O_n$ are on, and $I_n$ is off until $AD_1 \geq X$ or $TD_1 \leq Y$, wherein X and Y are selected concentrations of $NH_3$ and TSS, respectively, and wherein in cycle $C_2$, $I_n$ and $O_1$ are on, and $I_1$ is off until $AD_n \geq X$ or $TD_n \leq Y$.

2. The system of claim 1, wherein filter $F_1$ is in a cleaning mode in cycle $C_1$.

3. The system of claim 1, wherein filter $F_n$ is in a cleaning mode in cycle $C_2$.

4. The system of claim 1, wherein filters $F_1$ and $F_n$ are membrane filters.

5. The system of claim 4, wherein filters $F_1$ and $F_3$ are hollow fiber membrane filters.

6. The system of claim 1, further comprising an air supply connected to said controller and adapted to supply air to one or more of said tanks.

7. A system for removing $NH_3$ from wastewater comprising:
   a) a first wastewater treatment tank $T_1$ having a first tank inlet $I_1$ and a first tank let $O_1$ with a first tank filter $F_1$;
   b) another wastewater treatment tank $T_{n-1}$ operatively connected to tank $T_1$ to permit wastewater to flow between tanks $T_1$ and $T_{n-1}$;
   c) an Nth wastewater treatment tank $T_n$ having an Nth tank inlet $I_n$ and an Nth tank outlet $O_n$ with an Nth tank filter $F_n$ operatively connected to tank $T_{n-1}$ to permit wastewater to flow between tanks $T_{n-1}$ and $T_n$;
   d) a $NH_3$ detector $AD_1$ connected to tank $T_1$;
   e) a $NH_3$ detector $AD_n$ connected to tank $T_n$;
   f) an air supply connected to at least one of said tanks; and
   g) a controller connected to an air supply inlets $I_1$ and $I_n$, outlets $O_1$ and $O_n$, filters $F_1$ and $F_n$, and $NH_3$ detectors $AD_1$ and $AD_n$, the controller shifting between operational cycles $C_1$ and $C_2$, wherein in cycle $C_1$, $I_1$ and $O_n$ are on, and $I_n$ is off until $AD_1 \geq X$, wherein X is a selected concentration of $NH_3$ and wherein in cycle $C_2$, $I_n$ and $O_1$ are on and $I_1$ is off until $AD_n \geq X$.

8. The system of claim 7, wherein filter $F_1$ is in a cleaning mode in cycle $C_1$.

9. The system of claim 7, wherein filter $F_n$ is in a cleaning mode in cycle $C_2$.

10. The system of claim 7, wherein filters $F_1$ and $F_n$ are membrane filters.

11. The system of claim 7, wherein filters $F_1$ and $F_3$ are hollow fiber membrane filters.

12. The system of claim 7, further comprising an air supply connected to said controller and adapted to supply air to one or more of said tanks.

13. A system for removing BOD from wastewater comprising:
   a) a first wastewater treatment tank $T_1$ having a first tank inlet $I_1$ and a first tank outlet $O_1$ with a first tank filter $F_1$;
   b) another wastewater treatment tank $T_{n-1}$ operatively connected to tank $T_1$ to permit wastewater to flow between tanks $T_1$ and $T_{n-1}$;
   c) an Nth wastewater treatment tank $T_n$ having an Nth tank inlet $I_n$ and an Nth tank outlet $O_n$ with an Nth tank filter $F_n$ operatively connected to tank $T_{n-1}$ to permit wastewater to flow between tanks $T_{n-1}$, and $T_n$;
   d) a TSS detector $TD_1$ connected to tank $T_1$;
   e) a TSS detector $TD_3$ connected to tank $T_n$;
   f) a OUR detector $OD_1$ connected to tank $T_1$;
   g) a OUR detector $OD_3$ connected to tank $T_n$;
   h) an air supply connected to at least one of said tanks; and
   i) a controller connected to an air supply inlets $I_1$ and $I_n$, outlets $O_1$ and $O_n$, TSS detectors $TD_1$ and $TD_n$, OUR detectors $OD_1$ and $OD_n$, and filters $F_1$ and $F_n$, the controller shifting between operational cycles $C_1$ and $C_2$, wherein in cycle $C_1$, $I_1$ and $O_n$ are on, and $I_n$ is off until $TD_1 \leq Y$ or $OD_1 \geq X$ wherein Y is a selected concentration of TSS and X is a selected OUR, and wherein in cycle $C_2$, $I_3$ and $O_1$ are on and $I_1$ is off until $TD_n \leq Y$ or $OD_n \geq X$.

14. The system of claim 13, wherein filter $F_1$ is in a cleaning mode in cycle $C_1$.

15. The system of claim 13, wherein filter $F_n$ is in a cleaning mode in cycle $C_2$.

16. The system of claim 13, wherein filters $F_1$ and $F_n$ are membrane filters.

17. The system of claim 13, wherein filters $F_1$ and $F_3$ are hollow fiber membrane filters.

18. The system of claim 13, further comprising an air supply connected to said controller and adapted to supply air to one or more of said tanks.

19. A system for removing nutrients from wastewater comprising:
   a) a first wastewater treatment tank $T_1$ having a first tank inlet $I_1$ and a first tank outlet $O_1$ with a first tank filter $F_1$;
   b) an Nth wastewater treatment tank $T_n$ having an Nth tank inlet $I_n$ and an Nth tank outlet $O_n$ with an Nth tank filter $F_n$;
   c) a second wastewater treatment tank $T_2$ operatively connected to tank $T_1$ to permit wastewater to flow between tanks $T_1$ and $T_2$ and having a second tank inlet $I_2$ connected to inlets $I_1$ and $I_n$;
   d) a third wastewater treatment tank $T_3$ operatively connected to tank $T_2$ to permit wastewater to flow between tanks $T_2$ and $T_3$;
   e) an N-1 wastewater treatment tank $T_{n-1}$ operatively connected to tanks $T_3$ and $T_n$ to permit wastewater to flow between tanks $T_3$ and $T_{n-1}$ and between tanks $T_{n-1}$ and $T_n$, and having an N-1 tank inlet $I_{n-1}$ connected to inlets $I_1$ and $I_n$;
   f) an $NH_3$ detector $AD_1$ connected to tank $T_1$;
   g) an $NH_3$ detector $AD_n$ connected to tank $T_n$;
   h) a TSS detector $TD_1$ connected to tank $T_1$;
   i) a TSS detector $TD_n$ connected to tank $T_n$;
   j) an $NO_3$ detector $ND_2$ connected to tank $T_2$;
   k) an $NO_3$ detector $ND_{n-1}$ connected to tank $T_{n-1}$;
   l) an air supply connected to at least one of said tanks;
   m) a mixing device connected to at least one of said tanks; and
   n) a controller connected to the air supply mixing device, inlets $I_1$, $I_2$, $I_{n-1}$ and $I_n$, outlets $O_1$ and $O_n$, $NH_3$ detectors $AD_1$ and $AD_n$, TSS detectors $TD_1$ and $TD_n$, $NO_3$ detectors $ND_2$ and $ND_{n-1}$, and filters $F_1$ and $F_n$, the controller shifting between operational cycles $C_1$ and $C_2$, wherein, in cycle $C_1$, $I_1$ and $O_n$ are on and $I_n$ is off, and $I_2$ and $I_{n-1}$ are on at j and k, wherein j and k are selected percentages of $I_1$,
   until 1) $AD_1 \geq X$ or $TD_1 \leq Y$, or 2) $ND_{n-1} + AD_1 \geq Z$, wherein X, Y and Z are selected concentrations of $NH_3$, TSS and $NO_3 + NH_3$, respectively, and wherein in cycle $C_2$, $I_n$ and $O_1$ are on and $I_1$ is off, and $I_{n-1}$ and 12 are on at 1 and m, wherein 1 and m are selected percentages of $I_n$, and wherein the air supply is shut off in $T_{2+1}$ when $ND_2 \geq A$ is in cycle $C_1$ and in $T_{n-2}$ when $ND_{n-1} \geq A$ is in cycle $C_2$, wherein A is a selected concentration of $NO_3$.

20. The system of claim 19, wherein filter $F_1$ is in a cleaning mode in cycle $C_1$.

21. The system of claim 19, wherein filter $F_n$ is in a cleaning mode in cycle $C_2$.

22. The system of claim 19, wherein filters $F_1$ and $F_n$ are membrane filters.

23. The system of claim 19, wherein filters $F_1$ and $F_n$ are hollow fiber membrane filters.

24. A system for removing phosphorus from wastewater comprising:
   a) a first wastewater treatment tank $T_1$ having a first tank inlet $I_1$ and a first tank outlet $O_1$ with a first tank filter $F_1$;
   b) an Nth wastewater treatment tank $T_n$ having an Nth tank inlet $I_n$ and an Nth tank outlet $O_n$ with an Nth tank filter $F_n$;
   c) a second wastewater treatment tank $T_2$ operatively connect to tank $T_1$ to permit wastewater to flow between tanks $T_1$ and $T_2$;
   d) a third wastewater treatment tank $T_3$ operatively connected to tank $T_2$ to permit wastewater to flow between tanks $T_2$ and $T_3$;
   e) an N-1 wastewater treatment tank $T_{n-1}$ operatively connected to tanks $T_3$ and $T_n$ to permit wastewater to flow between tanks $T_3$ and $T_{n-1}$ and between tanks $T_{n-1}$ and $T_n$;
   f) a $PO_4$ detector $PD_1$ connected to tank $T_1$;
   g) a $PO_4$ detector $PD_n$ connected to tank $T_n$;
   h) a TSS detector $TD_1$ connected to tank $T_1$;
   i) a TSS detector $TD_n$ connected to tank $T_n$;
   j) an air supply and/or a mixing device connected to at least one of said tanks; and k) a controller connected to the air supply mixing device, inlets $I_1$ and $I_n$, outlets $O_1$ and $O_n$, $PO_4$ detectors $PD_1$ and $PD_n$, TSS detectors $TD_1$ and $TD_n$, and Filters $F_1$ and $F_n$, the controller shifting between operational cycles $C_1$ and $C_2$, wherein, in cycle $C_1$, the air is off in $T_1$ and on in $T_n$, $I_1$ and $O_n$ are on and $I_n$ and $O_1$ are off until 1) $PD_1 \leq X$ or $TD_1 \leq Y$ or 2) $PD_n \geq Z$ wherein X, Y, and Z are selected concentrations of $PO_4$, TSS, and $PO_4$, respectively, and wherein cycle $C_2$, the air is off in $T_n$ and on in $T_1$, $I_n$ and $O_1$ are on and $I_1$ and $O_n$ are off until 1) $PD_n \leq X$ or $TD_n \leq Y$ or 2) $PD_1 \geq Z$, wherein X, Y, and Z are selected concentrations of $PO_4$, TSS, and $PO_4$, respectively.

25. The system of claim 24, wherein filter $F_1$ is in cleaning mode in cycle $C_1$.

26. The system of claim 24, wherein filter $F_n$ is in cleaning mode in cycle $C_2$.

27. The system of claim 24, wherein filters $F_1$ and $F_n$ are membrane filters.

28. The system of claim 24, wherein filters $F_1$ and $F_n$ are hollow fiber membrane filters.

29. The system of claim 24, further comprising an air supply connected to said controller and adapted to supply air to one or more of said tanks.

* * * * *

UNITED STATES PATENT AND TRADEMARK OFFICE
CERTIFICATE OF CORRECTION

PATENT NO.   : 6,706,171 B2
DATED        : March 16, 2004
INVENTOR(S)  : Lee et al.

It is certified that error appears in the above-identified patent and that said Letters Patent is hereby corrected as shown below:

Column 10,
Line 28, please delete "12" to -- $I_2$ --.

Signed and Sealed this

Fifth Day of October, 2004

JON W. DUDAS
*Director of the United States Patent and Trademark Office*